(12) United States Patent
Narita et al.

(10) Patent No.: US 12,339,160 B2
(45) Date of Patent: Jun. 24, 2025

(54) LASER LIGHT PROFILE MEASURING DEVICE AND LASER LIGHT PROFILE MEASURING METHOD

(71) Applicants: MITSUBISHI HEAVY INDUSTRIES, LTD., Tokyo (JP); National Institute of Advanced Industrial Science and Technology, Tokyo (JP)

(72) Inventors: Ryuichi Narita, Tokyo (JP); Toshiya Watanabe, Tokyo (JP); Misaki Fukuyama, Tokyo (JP); Takeshi Kaneko, Tokyo (JP); Takayuki Numata, Ibaraki (JP)

(73) Assignees: MITSUBISHI HEAVY INDUSTRIES, LTD., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 288 days.

(21) Appl. No.: 18/149,928

(22) Filed: Jan. 4, 2023

(65) Prior Publication Data

US 2023/0251128 A1    Aug. 10, 2023

(30) Foreign Application Priority Data

Feb. 7, 2022  (JP) ................... 2022-017091

(51) Int. Cl.
  *G01J 1/04*  (2006.01)
  *G01J 1/02*  (2006.01)
(52) U.S. Cl.
  CPC ........... *G01J 1/0418* (2013.01); *G01J 1/0252* (2013.01); *G01J 1/0403* (2013.01)

(58) Field of Classification Search
  CPC ...... G01J 1/0418; G01J 1/0252; G01J 1/0403; G01J 1/4257; B23K 26/082; B23K 26/127; B23K 26/342; B23K 26/705
  See application file for complete search history.

(56) References Cited

U.S. PATENT DOCUMENTS 4,864,098 A * 9/1989 Basanese ............. B23K 26/704
                                                219/121.84
11,071,234 B2 * 7/2021 Huitink ................... F28F 3/022
(Continued)

FOREIGN PATENT DOCUMENTS

JP    2008-122202 A    5/2008
JP    4199820 B2    12/2008
(Continued)

*Primary Examiner* — Michelle M Iacoletti
*Assistant Examiner* — Maher Yazback
(74) *Attorney, Agent, or Firm* — Osha Bergman Watanabe & Burton LLP

(57) ABSTRACT

A laser light profile measuring device of the present disclosure includes a reflection attenuation part reflecting and attenuating at least part of laser light incident from a first direction in a direction different from the first direction to generate measurement target laser light traveling in the first direction, a capture unit placed on one side of the reflection attenuation part in the first direction and which captures the measurement target laser light, a cooling body covering at least part of the reflection attenuation part and the capture unit in a circumferential direction with respect to the first direction, a refrigerant supply unit forcibly feeding a refrigerant toward the cooling body, and a rotation support part supporting the reflection attenuation part, the cooling body, and the refrigerant supply unit to be rotatable around a rotation axis extending in a horizontal direction.

18 Claims, 7 Drawing Sheets

(56) References Cited

U.S. PATENT DOCUMENTS

| | | | | |
|---|---|---|---|---|
| 11,179,807 | B2* | 11/2021 | Martinsen | B23K 26/342 |
| 11,412,149 | B1* | 8/2022 | Gandhi | H04N 23/695 |
| 12,128,480 | B2* | 10/2024 | Thiel | B22F 10/366 |
| 2002/0181928 | A1* | 12/2002 | Chen | G02B 6/266 |
| | | | | 385/140 |
| 2003/0184746 | A1* | 10/2003 | Johnsen | G01N 21/15 |
| | | | | 356/300 |
| 2009/0032510 | A1 | 2/2009 | Ando et al. | |
| 2016/0184925 | A1* | 6/2016 | Huang | B22F 12/44 |
| | | | | 219/76.1 |
| 2018/0031417 | A1 | 2/2018 | Morimiya et al. | |
| 2020/0033075 | A1* | 1/2020 | Veto | F28F 13/12 |
| 2020/0036159 | A1* | 1/2020 | Wolf | B22F 5/10 |
| 2021/0402477 | A1 | 12/2021 | Miyashita | |
| 2022/0146305 | A1* | 5/2022 | Tung | G01J 1/0418 |
| 2022/0316867 | A1* | 10/2022 | Suzuki | G01B 11/2527 |
| 2023/0228622 | A1* | 7/2023 | Zinoviev | G01J 1/0407 |
| | | | | 250/239 |

FOREIGN PATENT DOCUMENTS

| | | | | |
|---|---|---|---|---|
| JP | 6244502 | B1 | 12/2017 | |
| JP | 6384589 | B2 | 9/2018 | |
| JP | 2018151353 | A * | 9/2018 | B23Q 17/20 |
| WO | 2017-209277 | A1 | 12/2017 | |

* cited by examiner

LASER LIGHT PROFILE MEASURING DEVICE AND LASER LIGHT PROFILE MEASURING METHOD

BACKGROUND OF THE INVENTION

Field of the Invention

The present disclosure relates to a laser light profile measuring device and a laser light profile measuring method.

Priority is claimed on Japanese Patent Application No. 2022-17091 filed on Feb. 7, 2022, the content of which is incorporated herein by reference.

DESCRIPTION OF RELATED ART

A three-dimensional additive manufacturing method called selective laser melting (SLM) is known. In this method, a desired modeled object is obtained by repeating a process of applying heat with laser light to a metal powder laid in a chamber and then melting and curing it for each layer a plurality of times.

Here, in order to obtain a satisfactory molded object, it is necessary to ascertain and adjust a profile of laser light precisely. A profile of laser light refers to a beam diameter of the laser light and a spatial intensity distribution. In an SLM modeling apparatus, it is essential to directly measure a profile of the laser light itself used for actual processing. Therefore, a measuring device needs to be disposed inside the chamber. For example, Japanese Patent No. 6384589 discloses a measuring device including a device for attenuating laser light and a measurement unit for measuring a profile of the attenuated laser light.

SUMMARY OF THE INVENTION

Incidentally, in an SLM modeling apparatus, a square-shaped processing region is set in the chamber. A laser light profile needs to be measured at a central portion of the processing region as a matter of course, and besides, a laser light profile needs to be measured also at a circumferential edge portion thereof in the same manner. However, the measuring device disclosed in Japanese Patent No. 6384589 is not only large in dimensions of its body size but also capable of measuring laser light only in one predetermined direction. Therefore, there has been a problem in that accurate measurement of a laser light profile cannot be performed at the circumferential edge portion in which the laser light is radiated from a direction and angle different from that at the central portion.

The present disclosure has been made to solve the above-described problems, and an objective thereof is to provide a smaller laser light profile measuring device and a laser light profile measuring method which are capable of measuring a laser light profile more accurately.

In order to solve the above-described problems, a laser light profile measuring device according to the present disclosure includes a reflection attenuation part reflecting and attenuating at least part of laser light incident from a first direction in a direction different from the first direction to generate measurement target laser light traveling in the first direction, a capture unit provided on one side of the reflection attenuation part in the first direction and configured to capture the measurement target laser light, a cooling body covering at least part of the reflection attenuation part and the capture unit in a circumferential direction with respect to the first direction, a refrigerant supply unit configured to forcibly feed a refrigerant toward the cooling body, and a rotation support part supporting the reflection attenuation part, the cooling body, and the refrigerant supply unit to be rotatable around a rotation axis extending in a horizontal direction.

A laser light profile measuring method according to the present disclosure is a laser light profile measuring method of a laser processing apparatus including a chamber having a square-shaped processing region on which a workpiece is disposed, and a laser irradiation unit radiating laser light to the processing region from an irradiation point above and scanning the processing region, and the laser light profile measuring method includes a first step in which the laser light profile measuring device described above is disposed at a central portion of the processing region to measure a laser light profile, and a second step in which the laser light profile measuring device is disposed along a circumferential edge portion of the processing region to sequentially measure a laser light profile, in which the rotation support part is rotated to align the radiation direction of the laser light with a first direction in the second step.

One more laser light profile measuring method according to the present disclosure is a laser light profile measuring method of a laser processing apparatus including a chamber having a square-shaped processing region on which a workpiece is disposed, and a laser irradiation unit radiating laser light, and the laser light profile measuring method includes a disposition step in which a near-field coupling element reflecting and attenuating at least part of the laser light radiated from the laser irradiation unit to generate measurement target laser light is disposed outside the chamber, and a measurement step in which a profile of the measurement target laser light is measured.

According to the present disclosure, it is possible to provide a smaller laser light profile measuring device and a laser light profile measuring method which are capable of measuring a laser light profile more accurately.

DETAILED DESCRIPTION OF THE INVENTION

First Embodiment

Hereinafter, a laser processing apparatus 1 and a laser light profile measuring device 30 according to a first embodiment of the present disclosure will be described with reference to FIGS. 1 to 6.

(Configuration of Laser Processing Apparatus)

The laser processing apparatus 1 according to the present embodiment is a modeling apparatus using a three-dimensional additive manufacturing method called selective laser melting (SLM). In this method, a desired modeled object is obtained by repeating a process of applying heat with laser light to a metal powder laid in a chamber and then melting and curing it for each of a plurality of layers.

Figure 1:
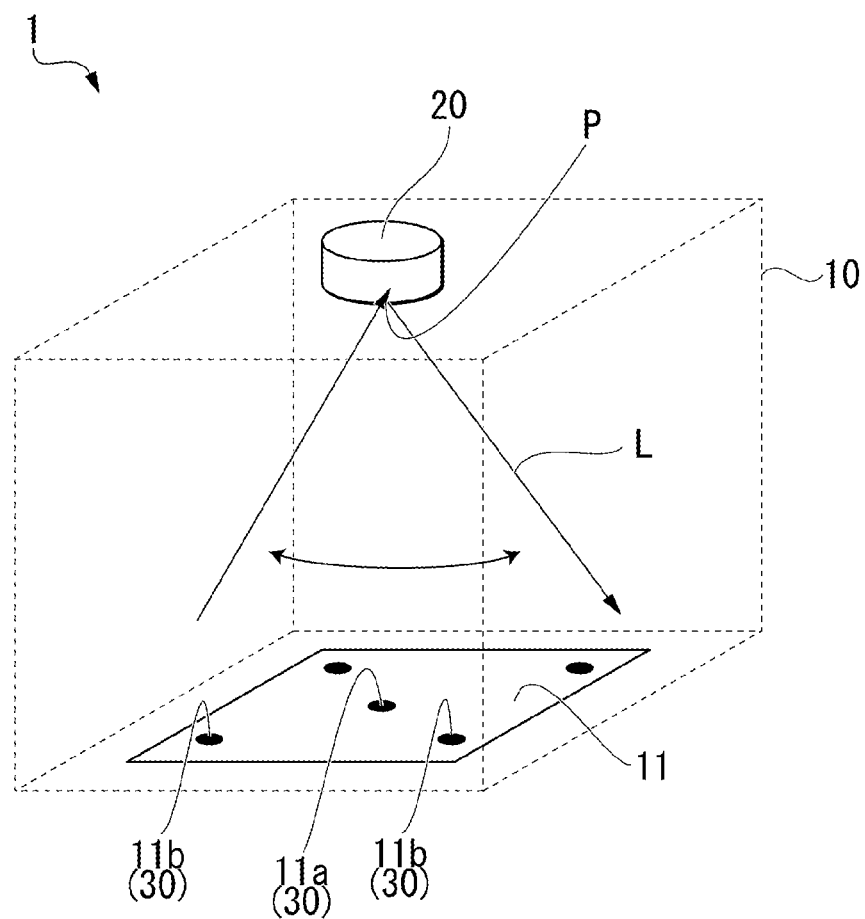
FIG. 1 is a schematic view illustrating an example of a configuration of a laser processing apparatus according to a first embodiment of the present disclosure.

As illustrated in FIG. 1, the laser processing apparatus 1 includes a chamber 10 and a laser irradiation unit 20. The chamber 10 has a box shape with a square-shaped processing region 11 on an inner bottom surface. The laser irradiation unit 20 radiates and scans laser light L from an irradiation point P provided above toward the processing region 11. When the laser light L is irradiated and scanned along a predetermined path with a metal powder supplied from a powder supply device (not illustrated), the metal powder is melted and cured to form one layer of the modeled object. The modeled object is formed by repeating this operation over a plurality of layers.

(Configuration of Laser Light Profile Measuring Device)

In order to obtain a satisfactory molded object by the above-described laser processing apparatus 1, it is necessary to ascertain and adjust a profile of the laser light L precisely. The profile of the laser light L refers to a beam diameter of the laser light L and a spatial intensity distribution. The laser light profile measuring device 30 according to the present embodiment is used to measure such a profile of the laser light L at a central portion 11a and a circumferential edge portion 11b of the processing region 11. Further, the circumferential edge portion 11b as used herein refers to a corner portion and a portion along a side portion of the square-shaped processing region 11. The laser light profile measuring device 30 is used with it disposed at the central portion 11a and the circumferential edge portion 11b.

Figure 2:
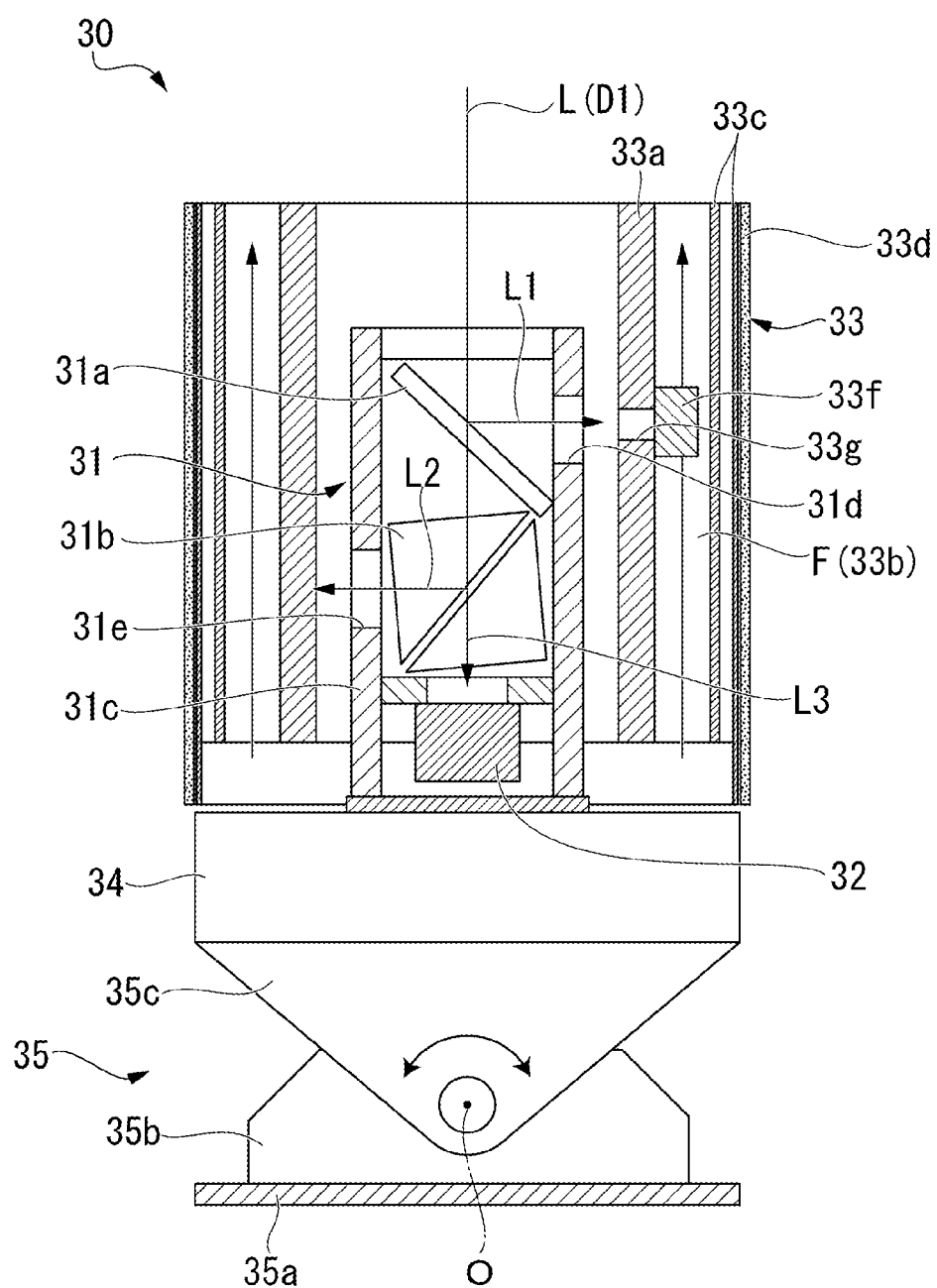
FIG. 2 is a cross-sectional view illustrating a configuration of a laser light profile measuring device according to the first embodiment of the present disclosure.

As illustrated in FIG. 2, the laser light profile measuring device 30 includes a reflection attenuation part 31, a capture unit 32, a cooling body 33, a refrigerant supply unit 34 and a rotation support part 35.

The reflection attenuation part 31 reflects at least part of the incident laser light L in a direction different from an incident direction and attenuates remaining components that have not been reflected, thereby generating measurement target laser light L3. Here, the incident direction of the laser light L is called a first direction D1.

The reflection attenuation part 31 includes a reflection attenuation element 31a and a near-field coupling element 31b. The reflection attenuation element 31a is an optical element formed in a plate shape, and is disposed on a path of the laser light L in a state inclined by about 45° with respect to the first direction D1. The reflection attenuation element 31a reflects at least part of the incident laser light L in a direction that intersects the first direction D1 by 90°, and thereby a first reflected light L1 is generated. Of all components of the laser light L, remaining components excluding the first reflected light L1 travel in the first direction D1.

The near-field coupling element 31b is provided on one side of the reflection attenuation element 31a in the first direction D1, that is below the reflection attenuation element 31a. The near-field coupling element 31b is a known optical element as disclosed in, for example, PCT International Publication No. WO 2017/209277. The near-field coupling element 31b is configured by disposing two prisms to face each other with a gap therebetween. When near-field light is generated and coupled between facing surfaces, it is possible to change the ratio of transmission and reflection of light at the facing surfaces.

In the present embodiment, when the above-described laser light L is incident on the near-field coupling element 31b, a part of the components is reflected and travels in a direction different from the first direction D1 (second reflected light L2). The remaining components of the laser light L, excluding the second reflected light L2, pass through the near-field coupling element 31b and travel in the first direction D1. Light passing through the reflection attenuation element 31a and the near-field coupling element 31b in this way and traveling in the first direction D1 is called the measurement target laser light L3. The measurement target laser light L3 has the same beam diameter and spatial intensity distribution as the original laser light L while the intensity is reduced compared to the original laser light L.

The capture unit 32 is provided below the reflection attenuation part 31 (on one side in the first direction D1). The capture unit 32 is, for example, a CCD camera. The capture unit 32 captures the measurement target laser light L3 and transmits it as image data to an external calculation device or the like. A laser light profile of the measurement target laser light L3 can be obtained through a calculation by the calculation device.

The reflection attenuation part 31 and the capture unit 32 described above are supported by a support frame 31c. The support frame 31c includes a first opening 31d for guiding the first reflected light L1 to the outside and a second opening 31e for guiding the second reflected light L2 to the outside. The support frame 31c is supported by the refrigerant supply unit 34 (to be described later) from one side (lower side) in the first direction D1.

The cooling body 33 is provided on an outer circumferential side of the reflection attenuation part 31 and the capture unit 32. The cooling body 33 covers at least part of the reflection attenuation part 31 and the capture unit 32 in a circumferential direction with respect to the first direction D1. In the present embodiment, the cooling body 33 has a cylindrical shape covering the reflection attenuation part 31 and the capture unit 32 throughout in the circumferential direction.

The cooling body 33 includes a cylindrical part 33a, fins 33b, a heat shield plate 33c and a heat insulating material 33d. The cylindrical part 33a has a cylindrical shape centered along the first direction D1. The fins 33b protrude radially outward from an outer circumferential surface of the cylindrical part 33a and are disposed at intervals in the circumferential direction. The fins 33b each have a plate shape extending throughout in the first direction D1 of the cylindrical part 33a.

Figure 3:
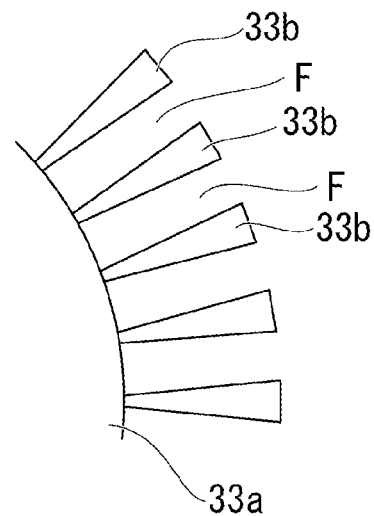
FIG. 3 is an enlarged view illustrating a configuration of a cooling body according to the first embodiment of the present disclosure.

As illustrated in FIG. 3, the fin 33b is formed such that the circumferential thickness thereof is gradually increased from a radially inside toward an outside when viewed from the first direction D1. Thereby, a space between the fins 33b adjacent in the circumferential direction has a rectangular shape when viewed from the first direction D1. Further, a space between the fins 33b serves as a refrigerant flow path F through which air flows as a refrigerant to be described later.

Also, as illustrated in FIG. 2, the fins 33b are covered by double concentric heat shield plates 33c having a cylindrical shape from an outer circumferential side. It is desirable that the heat shield plates 33c be made of, for example, aluminum. A gap extending in the radial direction is formed between the heat shield plates 33c. Some of the air as a refrigerant to be described later also flows into the gap. The heat insulating material 33d is provided on a further outer circumferential side of the outer heat shield plate 33c.

Figure 4:
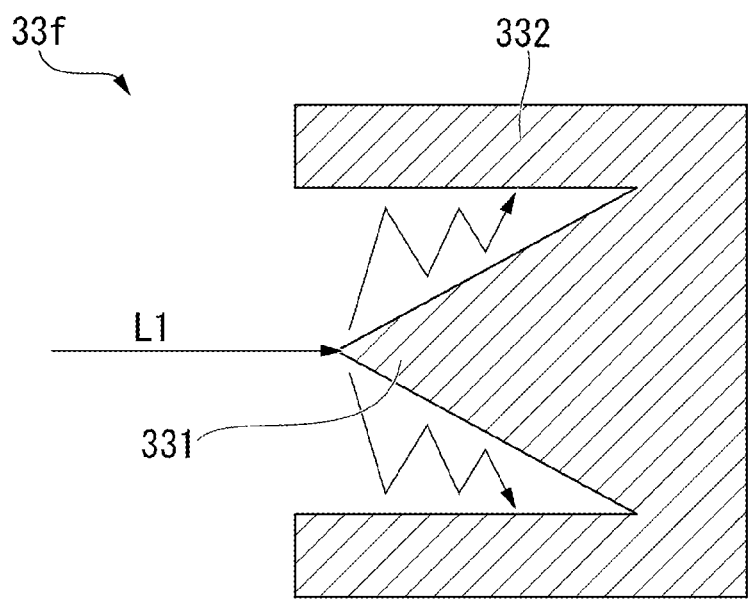
FIG. 4 is a cross-sectional view illustrating a configuration of a dump part according to the first embodiment of the present disclosure.

Here, an opening 33g is formed in a region of the cylindrical part 33a through which the first reflected light L1 passes. Further, a dump part 33f is provided on the outer circumferential side of the opening 33g. That is, the fins 33b described above are not provided in the region in which the dump part 33f is provided. The dump part 33f is provided to attenuate the first reflected light L1. As illustrated in FIG. 4, the dump part 33f includes a conical part 331 and an outer circumferential wall part 332. The conical part 331 has a conical shape with a diameter which gradually increases toward a forward side in a traveling direction of the first reflected light L1 (that is, radially outward with respect to the first direction D1). The outer circumferential wall part 332 has a cylindrical shape covering the conical part 331 from the outside.

The first reflected light L1 incident on the dump part 33f passes through an apex part of the conical part 331, repeats reflection between an inner circumferential surface of the outer circumferential wall part 332 and an outer circumferential surface of the conical part 331, and finally scatters and attenuates.

Further as illustrated in FIG. 2, the refrigerant supply unit 34 is provided on one side of the reflection attenuation part 31, the capture unit 32 and the cooling body 33 in the first direction D1, that is provided below of the reflection attenuation part 31, the capture unit 32 and the cooling body 33. The refrigerant supply unit 34 is, for example, a blower fan. The refrigerant supply unit 34 forcibly feeds air as a refrigerant toward the refrigerant flow path F described above. Further, it is also conceivable to use liquid nitrogen as the refrigerant in addition to air.

The reflection attenuation part 31, the capture unit 32, the cooling body 33 and the refrigerant supply unit 34 configured as described above are supported on a plane (on the processing region 11) by the rotation support part 35 from one side (that is from below) in the first direction D1. The rotation support part 35 has a pedestal 35a, a first frame 35b and a second frame 35c. The first frame 35b has a plate shape rising in the first direction D1 from the pedestal 35a. The second frame 35c is connected to the first frame 35b to be rotated around a rotation axis O extending in a horizontal direction. That is, angles of the reflection attenuation part 31, the capture unit 32, the cooling body 33 and the refrigerant supply unit 34 can be integrally changed with respect to the pedestal 35a with the rotation axis O as a center. Further, although not illustrated in detail, an actuator may be further provided for driving the rotation support part 35, or a configuration for manually rotating the rotation support part 35 may be employed.

(Measuring Method of Laser Light Profile)

Figure 5:
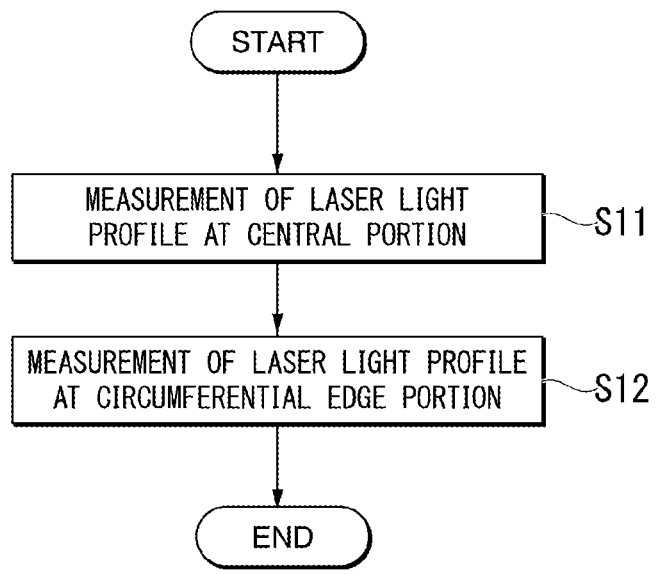
FIG. 5 is a flowchart showing steps of a laser light profile measuring method according to the first embodiment of the present disclosure.
Figure 6:
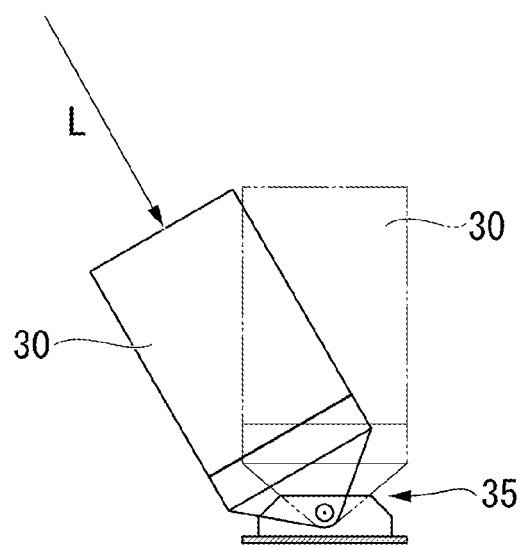
FIG. 6 is an explanatory view illustrating a state of a second step in the laser light profile measuring method according to the first embodiment of the present disclosure.

Next, an example of a method of use of the laser light profile measuring device (measuring method of a laser light profile) will be described with reference to FIGS. 5 and 6. As illustrated in FIG. 5, this measuring method includes a first step S11 and a second step S12. In the first step S11, the laser light profile measuring device 30 is disposed at the central portion 11a of the above-described processing region 11 to measure a laser light profile. At this time, the laser light L travels vertically downward from the irradiation point P. Therefore, a posture of the laser light profile measuring device 30 is in a state illustrated in FIG. 2.

Next, in the second step S12, the laser light profile measuring device 30 is disposed at the circumferential edge portion 11b of the processing region 11 and measurement of the laser light profile is performed. At this time, the laser light L is radiated obliquely downward from the irradiation point P. Therefore, as illustrated in FIG. 6, a posture of the laser light profile measuring device 30 is in a state in which an incident direction of the laser light L is aligned with the first direction D1 by rotating the rotation support part 35. All the steps of the laser light profile measuring method are completed by executing the second step S12 for each of a plurality of circumferential edge portions 11b.

(Operation and Effects)

Here, conventionally, in measuring a laser light profile of an SLM modeling apparatus, there is a problem in that measurement can be performed only at the central portion 11a of the processing region 11 because a body size of the measuring device is large or laser in only one predetermined direction can be measured. That is, it is difficult to perform accurate measurement of a laser light profile in the circumferential edge portion 11b in which the laser light L is radiated from a direction and angle different from that in the central portion 11a. Also, since high-power laser of about hundreds of W (watts) is used in the SLM modeling apparatus, it has been difficult to handle generated heat while properly attenuating the laser light. Therefore, the laser light profile measuring device 30 according to the present embodiment employs the above-described configurations.

According to the above-described configuration, when the refrigerant is supplied to the cooling body 33, the reflection attenuation part 31 and the capture unit 32 can be cooled via the cooling body 33. Thereby, heat generated by reflecting and attenuating the high-power laser light L can be dissipated into the refrigerant. Further, since the device is provided with the rotation support part 35, even if an emission direction of the laser light L changes, the laser light profile can be measured following the change. That is, even in the circumferential edge portion 11b in which the emission direction of the laser light L is different from that of the central portion 11a, the laser light profile can be accurately measured by changing a posture of the entire device using the rotation support part 35.

Further, according to the above-described configuration, the fins 33b of the cooling body 33 are each formed such that the circumferential thickness is gradually increased from the radially inside toward the outside. Thereby, a space (refrigerant flow path F) between the fins 33b is rectangular when viewed from the first direction D1. Therefore, unlike a case in which, for example, the fin 33b has a simple rectangular plate-shaped cross section, a width of the flow path through which the refrigerant flows can be made constant inside and outside the radial direction. As a result, the flow rate distribution of the refrigerant between the fins 33b is constant in the radial direction, and the cooling body 33 can be more efficiently cooled.

Also, according to the above-described configuration, since the device is provided with the dump part 33f, the laser light (first reflected light L1) reflected by the reflection attenuation part 31 is attenuated and converted to heat by being radiated to the dump part 33f. Thereby, the likelihood that heat generated by the reflection of the laser light will affect other external devices and members can be further reduced.

In addition, according to the above-described configuration, the dump part 33f has the conical part 331. Laser light incident on the apex part of the conical part 331 scatters around the apex part. Thereby, the laser light can be more effectively attenuated.

In further addition, according to the laser light profile measuring method described above, a laser light profile is measured at the central portion 11a of the processing region 11 in the first step S11, and then a laser light profile at the circumferential edge portion 11b is measured in the second step S12. At this time, a direction of the reflection attenuation part 31 and the capture unit 32 can be aligned with the radiation direction of the laser light L by rotating the rotation support part 35. Thereby, measurement of the laser light profile can be performed with high accuracy also at the circumferential edge portion 11b similarly to that in the central portion 11a.

The first embodiment of the present disclosure has been described above. Further, various changes and modifications can be made to the above-described configurations and method without departing from the gist of the present disclosure. For example, the configuration of the rotation support part 35 described above is an example, and any configuration that can rotate (change) a posture of the entire device is included in the present disclosure. Also, in the first embodiment described above, an example in which the capture unit 32 is supported to be allowed to rotate by the rotation support part has been described. In this case, a defocus of the laser light can be captured even at the circumferential edge portion 11b of the processing region 11. On the other hand, it is also possible to employ a configuration in which the capture unit 32 is placed on a floor surface (processing region 11) so as to restrict the rotation while being isolated from the rotation support part 35 and is supported to be parallel to the processing region 11. Further, the "parallel" as used herein refers to substantially parallel, and a slight error is allowed. In this case, the appearance of the laser light profile being ovalized on the floor surface can also be captured in addition to the defocus of the laser light at the circumferential edge portion 11b.

Figure 7:
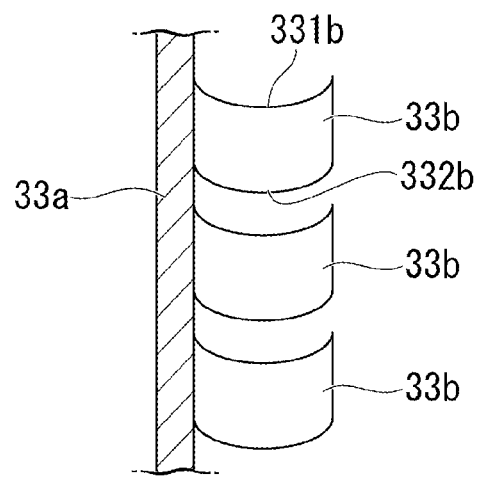
FIG. 7 is a view illustrating a modified example of a cooling body according to the first embodiment of the present disclosure and is a view from a circumferential direction.
Figure 8:
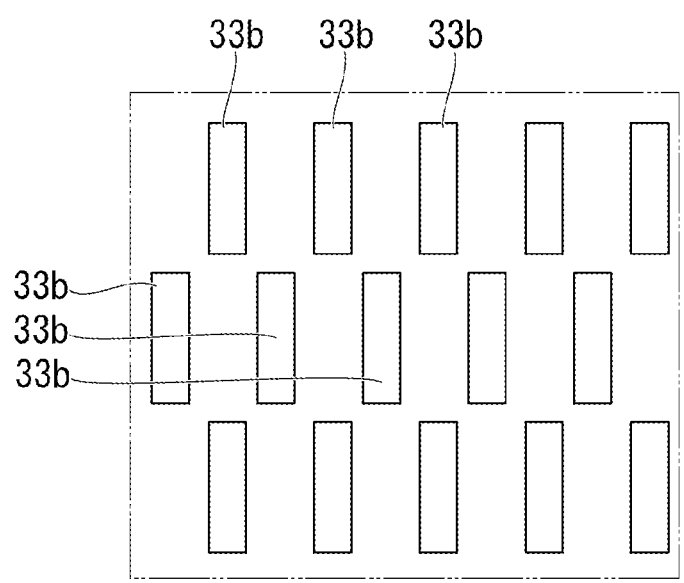
FIG. 8 is a view illustrating a modified example of the cooling body according to the first embodiment of the present disclosure and is a view from a radial direction.

Further, as a modified example of the fin 33b, configurations illustrated in FIGS. 7 and 8 can also be employed. In the example illustrated in FIGS. 7 and 8, the fin 33b is curved such that a first end surface 332b facing one side in the first direction D1 is convex toward one side (lower side) in the first direction D1 when viewed from the circumferential direction. Also, a second end surface 331b facing the other side is curved to be concave toward one side (lower side) in the first direction D1.

Also, as illustrated in FIG. 8, positions in the circumferential direction are different between the fins 33b adjacent in the first direction D1.

According to the above-described configuration, the first and second end surfaces of the fin 33b in the first direction D1 are each curved toward one side in the first direction D1. That is, both the first and second end surfaces of the fin 33b are curved toward a side in which the refrigerant is flowed in. Thereby, the likelihood that separation of the flow will occur when the refrigerant is flowed in can be reduced. As a result, the cooling body 33 can be more efficiently cooled.

Second Embodiment

Figure 9:
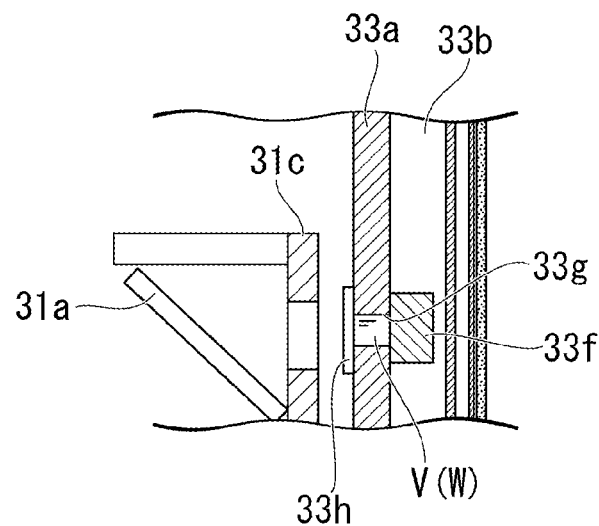
FIG. 9 is a cross-sectional view illustrating a configuration of a cooling body according to a second embodiment of the present disclosure.

Next, a second embodiment of the present disclosure will be described with reference to FIG. 9. Further, components the same as those in the above-described first embodiment will be denoted by the same reference signs, and detailed description thereof will be omitted. As illustrated in FIG. 9, a configuration of a cooling body 33 is different in the present embodiment. The cooling body 33 further includes a transmission window 33h blocking the above-described opening 33g from an inner circumferential side. The transmission window 33h is a transparent member made of, for example, glass and is capable of transmitting first reflected light L1 therethrough. Also, a space V defined by the transmission window 33h, a dump part 33f, and an inner wall surface of the opening 33g is filled with water W (liquid).

According to the above-described configuration, the space V defined by the transmission window 33h and the dump part 33f is filled with the water W. Thereby, energy of the laser light (first reflected light L1) is absorbed by the water. As a result, the likelihood that heat of the laser light will affect the outside can be further reduced.

The second embodiment of the present disclosure has been described above. Further, various changes and modifications can be made to the above-described configurations and method without departing from the gist of the present disclosure. For example, in place of the water W described above, other liquids such as alcohol, oil, or the like can be used.

Third Embodiment

Figure 10:
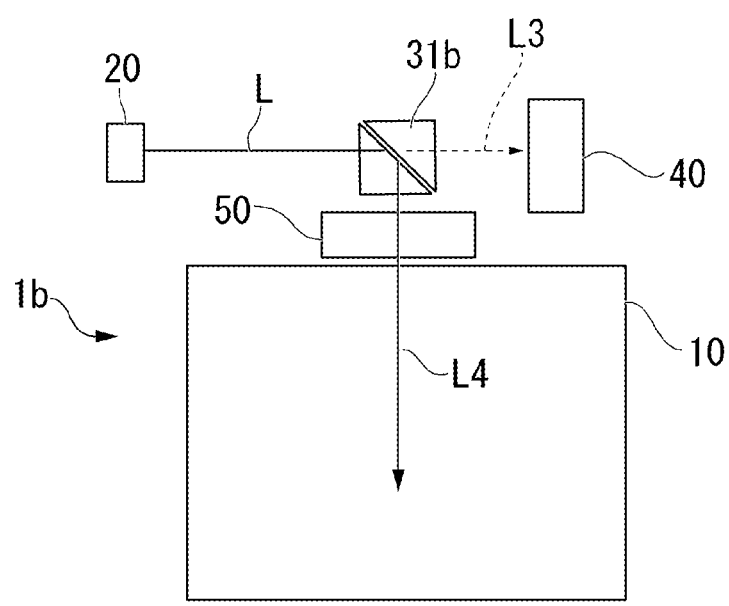
FIG. 10 is a schematic view illustrating a configuration of a laser light profile measuring device according to a third embodiment of the present disclosure.
Figure 11:
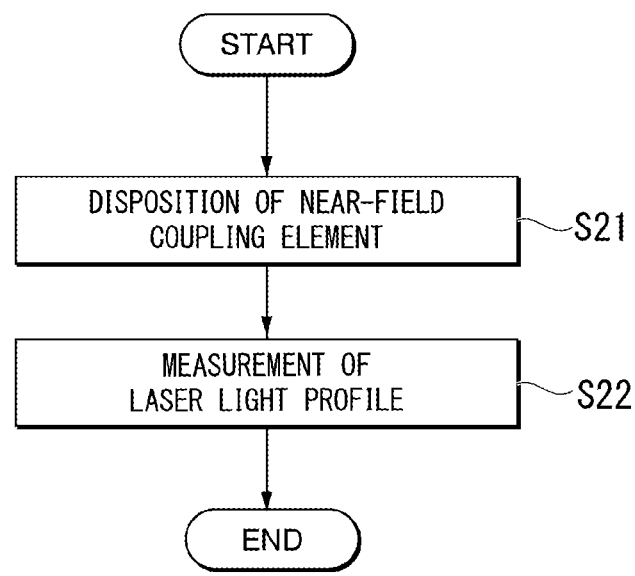
FIG. 11 is a flowchart showing steps of a laser light profile measuring method according to the third embodiment of the present disclosure.

Next, a third embodiment of the present disclosure will be described with reference to FIGS. 10 and 11. Further, components the same as those in the above-described embodiments will be denoted by the same reference signs, and detailed description thereof will be omitted. As illustrated in FIG. 10, a laser processing apparatus 1b according to the present embodiment includes a chamber 10 having a processing region 11, a laser irradiation unit 20 for radiating laser light L, a near-field coupling element 31b disposed on a path of the laser light L, a measurement unit 40 and a laser scanning unit 50.

The near-field coupling element 31b reflects at least part of the laser light L radiated from the laser irradiation unit 20 and guides it to the laser scanning unit 50 as a main laser light L4. The laser scanning unit 50 scans the processing region 11 with the incident main laser light L4. On the other hand, remaining components transmitted through the near-field coupling element 31b is measurement target laser light L3. The measurement unit 40 is provided on a path of the measurement target laser light L3. The measurement unit 40 is, for example, a CCD camera, and measures the laser light profile of the measurement target laser light L3.

An example of a laser light profile measuring method using the above-described laser processing apparatus 1b will be described. As illustrated in FIG. 11, first, the near-field coupling element 31b is disposed at the above-described position outside the chamber 10 (disposition step S21). Next, the laser light L is radiated from the laser irradiation unit 20, and thereby a workpiece is modeled on the processing region 11. In the middle of this, the laser light profile of the measurement target laser light L3 transmitted through the near-field coupling element 31b is measured (measurement step S22). This measurement step S22 is performed intermittently or continuously until processing of a modeled object is completed.

According to the above-described method, the measurement target laser light L3 is generated from a part of the laser light L by the near-field coupling element 31b disposed outside the chamber 10. A profile of the measurement target laser light L3 is measured in the measurement step S22. Thereby, a profile of the laser light (main laser light L4) used for actual processing can be measured outside the chamber 10 in real time. As a result, molding can be performed with higher accuracy, and at the same time, when an abnormality occurs, it can be detected immediately and countermeasures can be taken.

The third embodiment of the present disclosure has been described above. Further, various changes and modifications can be made to the above-described configurations and method without departing from the gist of the present disclosure.

<Additional Statement>

The laser light profile measuring device 30 and the laser light profile measuring method described in the embodiments are grasped, for example, as follows.

(1) A laser light profile measuring device 30 according to a first aspect includes a reflection attenuation part 31 reflecting and attenuating at least part of laser light L incident from a first direction D1 in a direction different from the first direction D1 to generate measurement target laser light L3 traveling in the first direction D1, a capture unit 32 placed on one side of the reflection attenuation part 31 in the first direction D1 and configured to capture the measurement target laser light L3, a cooling body 33 covering at least part of the reflection attenuation part 31 and the capture unit 32 in a circumferential direction with respect to the first direction D1, a refrigerant supply unit 34 configured to forcibly feed a refrigerant toward the cooling body 33, and a rotation support part 35 supporting the reflection attenuation part 31, the cooling body 33, and the refrigerant supply unit 34 to be allowed to rotate around a rotation axis O extending in a horizontal direction.

According to the above-described configuration, when a refrigerant is supplied to the cooling body 33, the reflection attenuation part 31 and the capture unit 32 can be cooled via the cooling body 33. Thereby, heat generated by reflecting and attenuating the high-power laser light L can be dissipated into the refrigerant. Further, since the device is provided with the rotation support part 35, even if an emission direction of the laser light L changes, a laser light profile can be measured following the change.

(2) A laser light profile measuring device 30 according to a second aspect is the laser light profile measuring device 30 of the first aspect, in which the cooling body 33 may include a plurality of fins 33b extending in the first direction D1 and disposed at intervals in the circumferential direction, and the fins 33b may each be formed such that the circumferential thickness is gradually increased from a radially inside toward an outer side.

According to the above-described configuration, the fins 33b are each formed such that the circumferential thickness is gradually increased from the radially inside toward the outside. Thereby, a space between the fins 33b is rectangular when viewed from the first direction D1. Therefore, unlike a case in which, for example, the fin 33b has a simple rectangular plate-shaped cross section, a width of a flow path through which the refrigerant flows can be made constant inside and outside the radial direction. As a result, the flow rate distribution of the refrigerant between the fins 33b is constant in the radial direction, and the cooling body 33 can be more efficiently cooled.

(3) A laser light profile measuring device 30 according to a third aspect is the laser light profile measuring device 30 of the first aspect, in which the cooling body 33 may include a plurality of fins 33b disposed at intervals in the first direction D1 and the circumferential direction, and the fins 33b adjacent in the first direction D1 may have different positions from each other in the circumferential direction.

According to the above-described configuration, circumferential positions between the fins 33b adjacent in the first direction D1 are different. Thereby, a contact area of the refrigerant with respect to the fins 33b is increased, and the cooling body 33 can be more efficiently cooled.

(4) A laser light profile measuring device 30 according to a fourth aspect is the laser light profile measuring device 30 of the third aspect, in which a first end surface of the fin 33b facing one side in the first direction D1 may be curved to be convex toward one side in the first direction D1 when viewed from the circumferential direction, and a second end surface of the fin 33b facing the other side in the first direction D1 may be curved to be concave toward one side in the first direction D1 when viewed from the circumferential direction.

According to the above-described configuration, the first and second end surfaces of the fin 33b in the first direction D1 are each curved toward one side in the first direction D1. That is, the first and second end surfaces of the fin are curved toward a side in which the refrigerant is flowed in. Thereby, the likelihood that separation of the flow will occur when the refrigerant is flowed in can be reduced, and the cooling body 33 can be more efficiently cooled.

(5) A laser light profile measuring device 30 according to a fifth aspect is the laser light profile measuring device 30 according to any one of the first to fourth aspects, in which the reflection attenuation part 31 and the capture unit 32 may be covered by the cooling body 33 throughout in the circumferential direction.

According to the above-described configuration, the reflection attenuation part 31 and the capture unit 32 can be uniformly cooled by the cooling body 33 throughout in the circumferential direction.

(6) A laser light profile measuring device 30 according to a sixth aspect is the laser light profile measuring device 30 according to any one of the first to fifth aspects, in which an opening 33g through which the laser light reflected by the reflection attenuation part 31 passes may be formed in the cooling body 33, and a dump part 33f attenuating the reflected laser light may be placed on an outer circumferential side of the opening 33g.

According to the above-described configuration, since the device is provided with the dump part 33f, the laser light reflected by the reflection attenuation part 31 is attenuated by being radiated to the dump part 33f. Thereby, the likelihood that heat generated by the reflection of the laser light will affect other external devices and members can be further reduced.

(7) A laser light profile measuring device 30 according to a seventh aspect is the laser light profile measuring device 30 of the sixth aspect, in which the dump part 33f may include a conical part 331 with a diameter which gradually increases toward a forward side in a traveling direction of the reflected laser light.

According to the above-described configuration, laser light incident on an apex part of the conical part 331 scatters around the apex part. Thereby, the laser light can be more effectively attenuated.

(8) A laser light profile measuring device 30 according to an eighth aspect is the laser light profile measuring device 30 of the sixth or seventh aspect, in which the cooling body 33 may further include a transmission window 33h blocking the opening 33g to be allowed to transmit the reflected laser light therethrough, and wherein a space V defined by the transmission window 33h and the dump part 33f may be filled with a liquid.

According to the above-described configuration, the space V defined by the transmission window 33h and the dump part 33f is filled with a liquid. Thereby, energy of the laser light is absorbed by the liquid. As a result, the likelihood that heat of the laser light will affect the outside can be further reduced.

(9) A laser light profile measuring device 30 according to a ninth aspect is the laser light profile measuring device 30 according to any one of the first to eighth aspects, in which the capture unit 32 may be supported to be allowed to rotate around the rotation axis O by the rotation support part 35.

According to the above-described configuration, a defocus of the laser light profile can be captured by the capture unit 32 even at a circumferential edge portion of a processing region.

(10) A laser light profile measuring device 30 according to a tenth aspect is the laser light profile measuring device 30 according to any one of the first to eighth aspects, in which the capture unit 32 may be placed on a floor surface so as to restrict the rotation while being isolated from the rotation support part and is to be parallel to the processing region 11 separately from the rotation support part 35.

According to the above-described configuration, a defocus of the laser light profile and the appearance of it being ovalized can be captured by the capture unit 32 even at the circumferential edge portion of the processing region.

(11) A laser light profile measuring method according to an eleventh aspect is a laser light profile measuring method of a laser processing apparatus 1 including a chamber 10 having a square-shaped processing region 11 on which a workpiece is disposed, and a laser irradiation unit 20 radiating laser light L to the processing region 11 from an irradiation point P above and scanning the processing region 11, and the laser light profile measuring method includes a first step S11 in which a laser light profile measuring device 30 according to any one of the first to tenth aspects is disposed at a central portion 11a of the processing region 11 to measure a laser light profile, and a second step S12 in which the laser light profile measuring device 30 is disposed along a circumferential edge portion 11b of the processing region 11 to sequentially measure a laser light profile, in which the rotation support part 35 is rotated to align the radiation direction of the laser light L with a first direction D1 in the second step S12.

According to the above-described method, a laser light profile is measured at the central portion 11a of the processing region 11 in the first step S11, and then a laser light profile at the circumferential edge portion 11b is measured in the second step S12. At this time, a direction of the reflection attenuation part 31 and the capture unit 32 can be aligned with the radiation direction of the laser light L by rotating the rotation support part 35. Thereby, measurement of the laser light profile can be performed with high accuracy also at the circumferential edge portion 11b similarly to that in the central portion 11a.

(12) A laser light profile measuring method according to a twelfth aspect is a laser light profile measuring method of a laser processing apparatus 1b including a chamber 10 having a square-shaped processing region on which a workpiece is disposed, and a laser irradiation unit 20 radiating laser light, and the laser light profile measuring method includes a disposition step S21 in which a near-field coupling element 31b that reflects and attenuates at least part of the laser light L radiated from the laser irradiation unit 20 to generate measurement target laser light L3 is disposed outside the chamber 10, and a measurement step S22 in which a profile of the measurement target laser light L3 is measured.

According to the above-described method, the measurement target laser light L3 is generated from a part of the laser light by the near-field coupling element 31b disposed outside the chamber 10. A profile of the measurement target laser light L3 is measured in the measurement step S22. Thereby, a profile of the laser light used for actual processing can be measured outside the chamber 10 in real time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 1, 1b Laser processing apparatus
10 Chamber
11 Processing region
11a Central portion
11b Circumferential edge portion
20 Laser irradiation unit
30 Laser light profile measuring device
31 Reflection attenuation part
31a Reflection attenuation element
31b Near-field coupling element
31c Support frame
31d First opening
31e Second opening
32 Capture unit
33 Cooling body
33a Cylindrical part
33b Fin
33c Heat shield plate
33d Heat insulating material
33f Dump part
33g Opening
33h Transmission window
34 Refrigerant supply unit
35 Rotation support part
35a Pedestal
35b First frame
35c Second frame
40 Measurement unit
50 Laser scanning unit
331 Conical part
332 Outer circumferential wall part
331b, 332b End surface
D1 First direction
F Refrigerant flow path
L Laser light L1 First reflected light
L2 Second reflected light
L3 Measurement target laser light
L4 Main laser light
O Rotation axis
P Irradiation point
V Space
W Water (liquid)

What is claimed is:

1. A laser light profile measuring device comprising:
an optical attenuator reflecting and attenuating at least part of laser light incident from a first direction in a direction different from the first direction to generate measurement target laser light traveling in the first direction;
a camera placed on one side of the optical attenuator in the first direction and configured to capture the measurement target laser light;
a cooling body covering at least part of the optical attenuator and the camera in a circumferential direction with respect to the first direction;
a blower fan configured to forcibly feed a refrigerant toward the cooling body; and
a pedestal on which the optical attenuator, the cooling body, and the blower fan are rotatably supported about a rotation axis extending in a horizontal direction, wherein
the cooling body includes fins extending in the first direction and disposed at intervals in the circumferential direction, and
a circumferential thickness of each of the fins gradually increases from a radially inside toward an outer side such that spaces between adjacent ones of the fins have a rectangular shape when viewed from the first direction.

2. The laser light profile measuring device according to claim 1, wherein
the cooling body includes a plurality of fins disposed at intervals in the first direction and the circumferential direction, and
the fins adjacent in the first direction have different positions from each other in the circumferential direction.

3. The laser light profile measuring device according to claim 2, wherein
a first end surface of the fin facing one side in the first direction is curved to be convex toward one side in the first direction when viewed from the circumferential direction, and
a second end surface of the fin facing the other side in the first direction is curved to be concave toward one side in the first direction when viewed from the circumferential direction.

4. The laser light profile measuring device according to claim 1, wherein the optical attenuator and the camera are covered by the cooling body throughout in the circumferential direction.

5. The laser light profile measuring device according to claim 1, wherein
an opening through which the laser light reflected by the optical attenuator passes is formed in the cooling body, and
a dump part attenuating the reflected laser light is placed on an outer circumferential side of the opening.

6. The laser light profile measuring device according to claim 5, wherein the dump part includes a conical part with a diameter which gradually increases toward a forward side in a traveling direction of the reflected laser light.

7. The laser light profile measuring device according to claim 5, wherein
the cooling body further includes a transmission window blocking the opening to be allowed to transmit the reflected laser light therethrough, and
wherein a space defined by the transmission window and the dump part is filled with a liquid.

8. The laser light profile measuring device according to claim 1, wherein the camera is supported to be allowed to rotate around the rotation axis by the pedestal.

9. The laser light profile measuring device according to claim 1, wherein the camera is placed on a floor surface so as to restrict the rotation while being isolated from the pedestal and is supported to be parallel to a square-shaped processing region on which a workpiece is disposed.

10. A laser light profile measuring device comprising:
an optical attenuator reflecting and attenuating at least part of laser light incident from a first direction in a direction different from the first direction to generate measurement target laser light traveling in the first direction;
a camera placed on one side of the optical attenuator in the first direction and configured to capture the measurement target laser light;
a cooling body covering at least part of the optical attenuator and the camera in a circumferential direction with respect to the first direction;
a blower fan configured to forcibly feed a refrigerant toward the cooling body; and
a pedestal on which the optical attenuator, the cooling body, and the blower fan are rotatably supported about a rotation axis extending in a horizontal direction, wherein
an opening through which the laser light reflected by the optical attenuator passes is formed in the cooling body, and
a dump part attenuating the reflected laser light is disposed on an outer circumferential side of the cooling body.

11. The laser light profile measuring device according to claim 10, wherein
the cooling body includes fins extending in the first direction and disposed at intervals in the circumferential direction, and
a circumferential thickness of each of the fins gradually increases from a radially inside toward an outer side.

12. The laser light profile measuring device according to claim 10, wherein
the cooling body includes a plurality of fins disposed at intervals in the first direction and the circumferential direction, and
the fins adjacent in the first direction have different positions from each other in the circumferential direction.

13. The laser light profile measuring device according to claim 12, wherein
a first end surface of the fin facing one side in the first direction is curved to be convex toward one side in the first direction when viewed from the circumferential direction, and
a second end surface of the fin facing the other side in the first direction is curved to be concave toward one side in the first direction when viewed from the circumferential direction.

14. The laser light profile measuring device according to claim 10, wherein the optical attenuator and the camera are covered by the cooling body throughout in the circumferential direction.

15. The laser light profile measuring device according to claim 10, wherein the dump part includes a conical part with a diameter which gradually increases toward a forward side in a traveling direction of the reflected laser light.

16. The laser light profile measuring device according to claim 10, wherein
- the cooling body further includes a transmission window blocking the opening to be allowed to transmit the reflected laser light therethrough, and
- a space defined by the transmission window and the dump part is filled with a liquid.

17. The laser light profile measuring device according to claim 10, wherein the camera is supported to be allowed to rotate around the rotation axis by the pedestal.

18. The laser light profile measuring device according to claim 10, wherein the camera is placed on a floor surface so as to restrict the rotation while being isolated from the pedestal and is supported to be parallel to a square-shaped processing region on which a workpiece is disposed.

* * * * *